United States Patent
Ban et al.

(10) Patent No.: US 12,145,437 B2
(45) Date of Patent: Nov. 19, 2024

(54) SYSTEM AND METHOD FOR HANDLING DISENGAGEMENT AND ENGAGEMENT BETWEEN A PTO SYSTEM AND A TRACTION SYSTEM IN AN AT LEAST PARTLY ELECTRICALLY OPERATED VEHICLE

(71) Applicant: VOLVO TRUCK CORPORATION, Gothenburg (SE)

(72) Inventors: Branko Ban, Gothenburg (SE); Marinko Culjak, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 328 days.

(21) Appl. No.: 17/651,354

(22) Filed: Feb. 16, 2022

(65) Prior Publication Data
US 2022/0258602 A1 Aug. 18, 2022

(30) Foreign Application Priority Data
Feb. 17, 2021 (EP) .................................... 21157659

(51) Int. Cl.
| | |
|---|---|
| *B60K 17/28* | (2006.01) |
| *B60W 20/20* | (2016.01) |
| *B60W 20/40* | (2016.01) |
| *B60W 30/188* | (2012.01) |

(52) U.S. Cl.
CPC ............ *B60K 17/28* (2013.01); *B60W 20/20* (2013.01); *B60W 20/40* (2013.01); *B60W 30/1888* (2013.01)

(58) Field of Classification Search
CPC ... B60K 17/28; B60W 20/40; B60W 30/1886; B60W 30/1888; B60W 58/25; B60W 1/00; B60W 1/006; B60W 1/04; B60W 1/06; B60W 1/08
See application file for complete search history.

(56) References Cited

U.S. PATENT DOCUMENTS

| | | | |
|---|---|---|---|
| 2007/0012492 A1* | 1/2007 | Deng | B60L 50/13 180/65.1 |
| 2015/0135863 A1 | 5/2015 | Dalum | |
| 2016/0236633 A1* | 8/2016 | Mori | G01R 31/40 |
| 2019/0291594 A1 | 9/2019 | Li et al. | |

FOREIGN PATENT DOCUMENTS

| | | |
|---|---|---|
| WO | 2007002187 A2 | 1/2007 |
| WO | 2020001779 A1 | 1/2020 |

OTHER PUBLICATIONS

European Search Report dated Aug. 25, 2021 in corresponding European Patent Application No. 21157659.0, 10 pages.

* cited by examiner

*Primary Examiner* — Russell Frejd
*Assistant Examiner* — Sara J Lewandroski
(74) *Attorney, Agent, or Firm* — Venable LLP; Jeffri A. Kaminski

(57) ABSTRACT

A system for handling disengagement and engagement between a PTO system and a traction system in an at least partly electrically operated vehicle. The system is adapted to disengage the PTO system and the traction system from each other when the at least partly electrically operated vehicle is in driving mode. The system is adapted to engage the PTO system and the traction system to each other and thereby providing electrical power from the system to at least one external load when the at least one electrically operated vehicle is in stop mode.

12 Claims, 5 Drawing Sheets

SYSTEM AND METHOD FOR HANDLING DISENGAGEMENT AND ENGAGEMENT BETWEEN A PTO SYSTEM AND A TRACTION SYSTEM IN AN AT LEAST PARTLY ELECTRICALLY OPERATED VEHICLE

TECHNICAL FIELD

The invention generally relates to a system, a control device and a method performed by the control device. More particularly the invention relates to handling disengagement and engagement between a Power Take Off (PTO) system and a traction system in an at least partly electrically operated vehicle.

The invention can be applied in at least partly electrically operated vehicles. Although the invention will be described with respect to a fully electrified truck, the invention is not restricted to this particular vehicle, but may also be used in other vehicles such as buses, trailers, wheel loaders, articulated haulers, excavators, backhoe loaders, passenger cars, marine vessels, construction equipment, heavy duty vehicles etc. It may also be applied in electrical systems of e.g. electrically operated vessels and in various industrial construction machines or working machines. It is applicable in fully electrically operated vehicles as well as in hybrid vehicles, comprising also a combustion engine.

BACKGROUND

There is ongoing work related to reducing weight, cost and complexity of at least partly electrically operated vehicles, and this work will probably always be ongoing as these aims will always be of importance.

An at least partly electrically operated vehicle typically comprises an electric Power Take Off (PTO) system. A purpose of the electric PTO system is to provide power from the vehicle motor to external loads that does not have their own engine or motor. Examples of the external loads may be drills, compressors and various other tools. In more detail, an electric PTO system can provide three-phase, single phase or Direct Current (DC) voltage output to the such external loads.

Therefore, there is a need to at least mitigate or solve these issues.

SUMMARY

An object of the invention is to provide an improved system in an at least partly electrically operated vehicle.

According to a first aspect of the invention, the object is achieved by a system according to claim 1. The system is for handling disengagement and engagement between a PTO system and a traction system in an at least partly electrically operated vehicle. The system is adapted to disengage the PTO system and the traction system from each other when the at least partly electrically operated vehicle is in driving mode. The system is adapted to engage the PTO system and the traction system to each other and thereby providing electrical power from the system to at least one external load when the at least one electrically operated vehicle is in stop mode.

By the provision of the system adapted to engage and disengage the PTO system and the traction system to and from each other, there is an advantage of reduced complexity of the system because the traction system is already a part of the at least partly electrically operated vehicle for other purposes. Thus, the traction system is reused and provided with a second functionality in addition to the functionality it already has in system. Further advantages may be that the number of components in the system is reduced, that the weight of the system is reduced, that possible EMC issues are reduced etc.

Optionally, the traction system may comprise at least one electric machine comprising at least two winding coils, and the traction system may comprise a first switch and a second switch. With the at least two winding coils, the electric machine may be adapted to function as a galvanic insulator in the system. An advantage of the first switch and the second switch may be that they enable the PTO system and the traction system to be engaged and disengaged to and from each other.

Optionally, a control device may be adapted to control switching of the first switch and the second switch between open states and closed states. An advantage of the control device may be that it provides easy control of the first switch and the second switch. The control device may be a dedicated device, which provides an advantage of being easy to install, repair and replace.

Optionally, when the at least partly electrically operated vehicle is in driving mode, then the first switch may be adapted to be in closed state such that the at least two winding coils are connected in parallel and the at least one electric machine may be adapted to be used for traction of the at least partly electrically operated vehicle. Furthermore, when the at least partly electrically operated vehicle is in driving mode, then the second switch may be adapted to be in open state such that the PTO system is disengaged from the at least one external load. Hereby, there is an advantage of reduced complexity of the system and the at least partly electrically operated vehicle since the traction system is already a part of the vehicle for other purposes. Thus, the traction system is reused and provided with a second functionality in addition to the functionality it already has in system. Further advantages may be that the number of components in the system is reduced, that the weight of the system is reduced, that possible EMC issues are reduced etc. An advantage of the PTO system being disengaged from the at least one external load when the at least partly electrically operated vehicle is in driving mode is it may reduce the risk for any external loads to be unintendedly provided with power.

Optionally, when the at least partly electrically operated vehicle is in stop mode, then the first switch may be adapted to be in open state such that a first winding coil is adapted to function as a primary transformer coil and a second winding coil may be adapted to function as a secondary transformer coil. Furthermore, when the at least partly electrically operated vehicle is in stop mode, then the at least one electric machine may be adapted to be function as a 1:1 ratio transformer and thus functioning as a galvanic insulator in the system. An advantage of using the electric machine as a galvanic insulator is that the total weight of the system is reduced, the system complexity is reduced, and there is also an increase in system safety.

Optionally, the traction system comprises at least one traction battery and at least one inverter. The traction battery enables power to be provided to the external load. An advantage of the inverter may be that the power from the traction battery may be switch to the type or form of power that can be used by the electric machine, e.g. switching from DC to AC.

Optionally, the at least one electric machine is of a synchronous reluctance type or an induction type. Synchronous reluctance or induction machine types are not permanently magnetized which gives them an advantage to be directly used as galvanic insulator, i.e. a 1:1 ratio transformer.

Optionally, the at least one electric machine does not have permanent magnets on its rotor. An advantage of the absence of permanent magnets may be that the complexity of the system is reduced.

Optionally, the electric power provided to the at least one externa load may comprise three-phase voltage, single phase voltage or DC voltage. An advantage of these power types may be that the power may be utilized by a large number of external loads as these power types are commonly used.

According to a second aspect of the invention, the object is achieved by an at least partly electric vehicle according to claim 10. The at least partly electric vehicle comprises the system described above. Advantages and effects of the second aspect of the invention are similar to the advantages and effects with respect to the first aspect of the invention. It shall also be noted that all embodiments of the first aspect of the invention are applicable to and combinable with all embodiments of the second aspect of the invention and vice versa.

According to a third aspect of the invention, the object is achieved by a method according to claim 11. The method is performed by a control device comprised in an at least partly electrically operated vehicle for handling engagement and disengagement between a PTO system and a traction system comprised in a system of the at least partly electrically operated vehicle. The control device triggers the PTO system and the traction system to be disengaged from each other when the at least partly electrically operated vehicle is in driving mode. The control device triggers the PTO system and the traction system to be engaged to each other and thereby providing electrical power from the system to at least one external load when the at least one electrically operated vehicle is in stop mode. Advantages and effects of the third aspect of the invention are similar to the advantages and effects with respect to the first aspect of the invention. It shall also be noted that all embodiments of the first aspect of the invention are applicable to and combinable with all embodiments of the third aspect of the invention and vice versa.

According to a fourth aspect of the invention, the object is achieved by a control unit according to claim 12. The control unit is adapted to perform a method as described above. Advantages and effects of the fourth aspect of the invention are similar to the advantages and effects with respect to the first aspect of the invention. It shall also be noted that all embodiments of the first aspect of the invention are applicable to and combinable with all embodiments of the fourth aspect of the invention and vice versa.

According to a fifth aspect of the invention, the object is achieved by a computer program. The computer program comprises instructions which, when executed on at least one processor, cause the at least one processor to carry out the method according to the third aspect.

According to a sixth aspect of the invention, the object is achieved by carrier. The carrier comprises the computer program of the fifth aspect, wherein the carrier is one of an electronic signal, optical signal, radio signal or computer readable storage medium.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
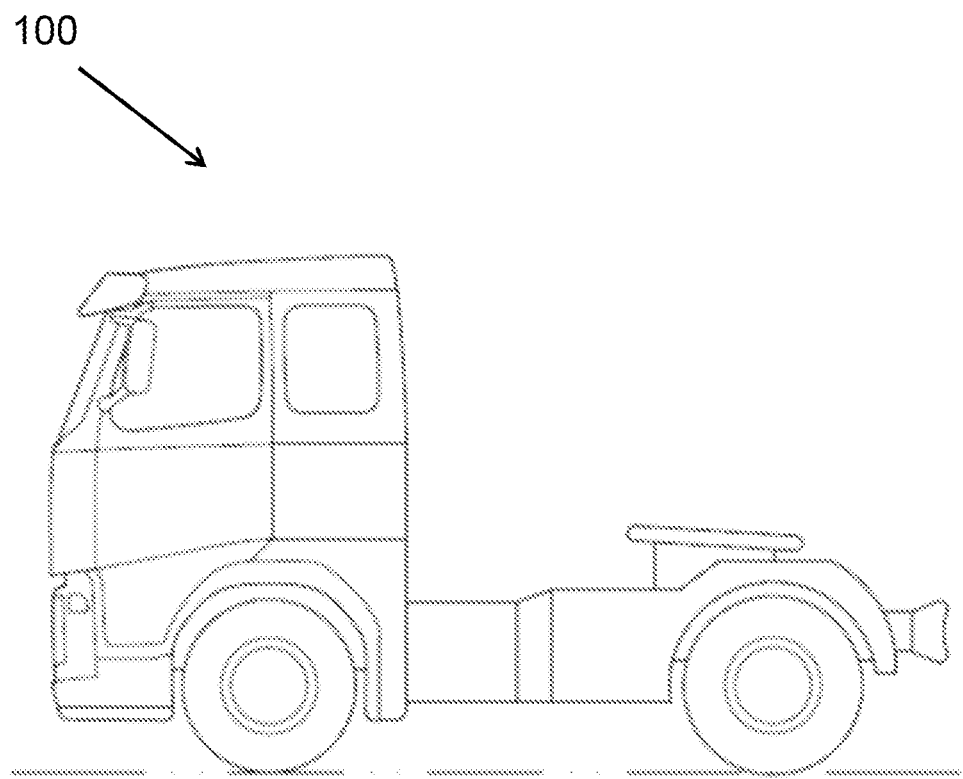
FIG. 1 is a drawing illustrating an at least partly electrically operated vehicle.

FIG. 1 illustrates an at least partly electrical vehicle 100. The at least partly electrical vehicle 100 may be fully electrically operated or it may be partly electrically operated vehicle. The term vehicle may be used herein for the sake of simplicity when referring to the at least partly electrically operated vehicle 100.

The vehicle 100 may be a vehicle, such as a truck, airplane, bus, construction equipment, trailer, wheel loader, excavator, passenger car, a marine vessel, an electrically operated vessel, a working machine, stationary backup power solution etc., or any other type of vehicle mentioned herein.

The vehicle 100 may be in a driving mode or a stop mode.

Figure 2:
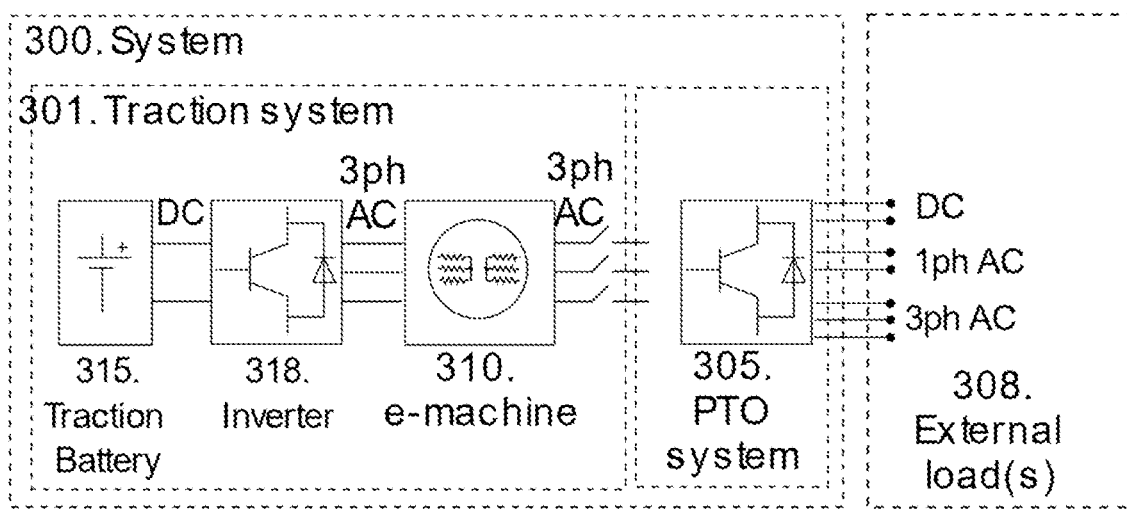
FIG. 2 is a schematic block diagram illustrating a system.

FIG. 2 illustrates a system 300. The system 300 is comprised in the vehicle 100. The system 300 comprises a traction system 301 and a PTO system 305. The system 300 is adapted to be connected to at least one external load 308. The system 300 may be referred to as an electric PTO system.

The traction system 301 is adapted to drive and move the vehicle 100. The traction system 301 may be referred to as an electric traction system, i.e. it uses electric power to operate the vehicle 100. The traction system 301 may comprises one or more of: at least one electric machine 310, a traction battery 315 and an inverter 318. The traction battery 315 is adapted to output DC power to the inverter 318, and the inverter 318 is adapted to invert the DC into AC, e.g. 3-phase AC, which is outputted to the electric machine 310. The inverter 318 may be a traction inverter. The traction system 301 may be referred to as a vehicle traction system.

Having only one inverter 318 comprised in the vehicle 100 is beneficial, both space wise and cost wise.

The electric machine 310 may function as a transformer for the PTO system 305, The electric machine 310, also referred to as e-machine or a traction electric machine, may be of a synchronous reluctance type or an induction type. The electric machine 310 may have at least three or more phases. A synchronous reluctance type of electric machine 310 may be adapted to run at synchronous speed. An induction type of electric machine 310, also referred to as an asynchronous motor, is a machine where electric current in the rotor needed to produce torque is obtained by electromagnetic induction from the magnetic field of the stator winding coils. The electric machine 310 may not have permanent magnets on its rotor. The use of the synchronous reluctance or induction machine may depend on the inverter layout and software decided by the vehicle manufacturer.

The system 300 is adapted to engage and disengage the traction system 301 and the PTO system 305 to and from each other. The engagement and disengagement may be enabled by one or more switches between the output of the electric machine 310 and the PTO system 305. These switches will be described in more detail later.

The PTO system 305 may be adapted to be connected to the external load 308. This may also be described as the system 300 being adapted to be connected to the external load 308. The PTO system 305 may be an interface towards the external load 308. The output of the PTO system 305 may be at least one of DC, 1-phase AC and 3-phase AC.

The PTO system 305 is adapted to provide power from the electric machine 310 to external loads 308 that does not have their own engine or motor. In more detail, the PTO system 305 may provide three-phase, single phase or DC power output to the external load 308. The PTO system 305 may be a power electronic PTO system.

The external load 308 may be seen as being comprised in the vehicle 100 or adapted to be connected to the vehicle 100. There may be one or more external loads 308. The external load 308 may not have its own engine or motor. The external load 308 may be adapted to run on three-phase, single phase or DC voltage. Examples of the external load 308 may be drills, compressors, pumps, cranes, lifts and various other tools. The external load 308 is provided with electrical power from the system 300 when the vehicle 100 is in stop mode, i.e. not when it is in driving mode.

Figure 3:
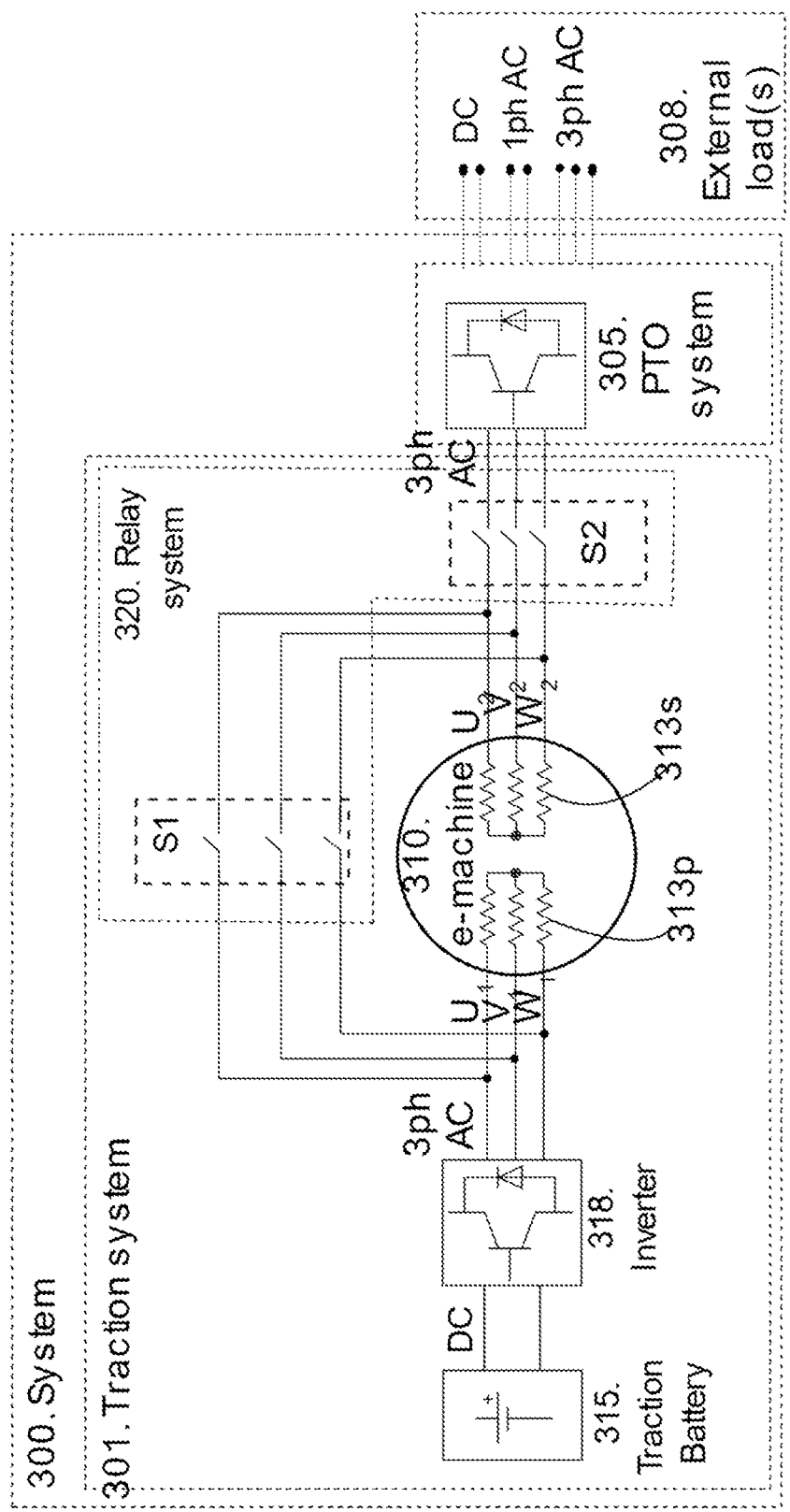
FIG. 3 is a schematic block diagram illustrating a system.

FIG. 3 is a schematic block diagram illustrating the system 300 in more detail. As seen in FIG. 3, the system 300 comprises the traction system 301 and the PTO system 305. The system 300 is adapted to be connected to the external load 308. Similar to FIG. 2, the traction system 301 seen in FIG. 3 may comprise the traction battery 315, the inverter 318 and the electric machine 310.

The electric machine 310 may comprise at least two winding coils 313p, 313s. The at least two winding coils 313p, 3131s may be parallel winding coils.

The system 300 may comprise a first switch S1 and a second switch S2. The first switch S1 may comprise one or more first sub switches, e.g. three first sub switches as exemplified in FIG. 3. The second switch S2 may comprise one or more second sub switches, e.g. three second sub switches as exemplified in FIG. 3. The first switch S1 and the second switch S2 may be comprised in a relay system 320. The relay system 320 may be adapted to separate electric machine winding parallel paths. The first switch S1 is adapted to be in an open state and a closed state, i.e. the state of the first switch S1 may change between being in an open state and a closed state. The second switch S2 may be adapted to be in an open state or a closed state, i.e. the state of the second switch S2 may change between being in an open state and a closed state. Changing of the state of the first switch S1 and the second switch S2 may be performed by a control device 600 (not seen in FIG. 3, but in FIG. 5). The control device 600 may be comprised in the system 300 or it may be comprised in the vehicle 100 and adapted to be connected to the system 300, e.g. adapted to be connected to the first switch S1 and the second switch S2, and possibly the relay system 320. The control device 600 may be comprised in the relay system 320 or adapted to be connected to the relay system 320.

The control device 600 will be described in more detail later with reference to FIG. 5.

Now, two scenarios will be described related to whether the vehicle 100 is in stop mode or in driving mode.

Driving Mode—Vehicle 100 is Driving and PTO System 305 is not Used:

When the vehicle 100 is in driving mode, the first switch S1 may be adapted to be in closed state and the second switch S2 may be adapted to be in open state. When the first switch S1 is in closed state, the at least two winding coils 313p, 313s are connected in parallel. Consequently, the at least one electric machine 310 may be adapted to be used for traction of the at least partly electrically operated vehicle 100. When the second switch S2 is adapted to be in open state, the PTO system 305 may be disengaged from the at least one external load 308. Using other words, under vehicle driving conditions, the first switch S1 may be adapted to be closed thus connecting the electric machine winding coils 313p, 313s in parallel and the electric machine 310 may be used purely for traction. At the same time, the second switch S2 may be in open state, the PTO system 305 and overall system 300 are both disengaged.

Stop Mode—Vehicle 100 is Standing Still and PTO System 305 is Used:

When the vehicle 100 is in stop mode, the first switch S1 may be adapted to be in open state and the second switch S2 may be adapted to be in closed state. When the first switch S1 is in open state, then a first winding coil 313p may be adapted to function as a primary transformer coil and a second winding coil 313s may adapted to function as a secondary transformer coil. Thus, the at least one electric machine 310 may be adapted to function as a 1:1 ratio transformer and thus functioning as a galvanic insulator in the system 300. The terms 1:1 ratio transformer, galvanic insulator and high frequency transformer may be synonyms and used interchangeably herein. The present invention provides galvanic insulation between two electrical energy storages. Using other words, when the vehicle 100 is in stop mode and the user wants to engage the system 300, the first switch S1 is opened thus changing the one of the winding coils 313p to become a primary transformer coil and the other winding coil 313s to become a secondary transformer coil. The second switch S2 may be in closed mode, e.g. it is connected, PTO system 305 is functional and the system 300 may be used. The electric machine 310 may now be used as a 1:1 ratio transformer and effectively acts as a galvanic insulator within the system 300 between the traction battery 315 and the inverter 318 and the PTO system 305. The at least partly electrically operated vehicle 100 may be adapted to stand still when the winding coils 313s, 313p are separated when the first switch S1 is in open state and the second switch S2 is in closed state.

Summarized, during driving conditions the PTO system 305 and the traction system 301 are not connected to each other. When the vehicle 100 stops, the system 300 is engaged and may provide electrical power to the external loads 308. The electric machine 310 may be adapted to function as a galvanic insulator for the system 300 when the first switch S1 is in open state and the second switch S2 is in closed state, and the electric machine 310 may be adapted to function as a traction machine for the vehicle 100 when the first switch S1 is closed and the second switch S2 is in open state.

Switch coordination may be performed via dedicated relay system, i.e. the control device 600.

Figure 4:
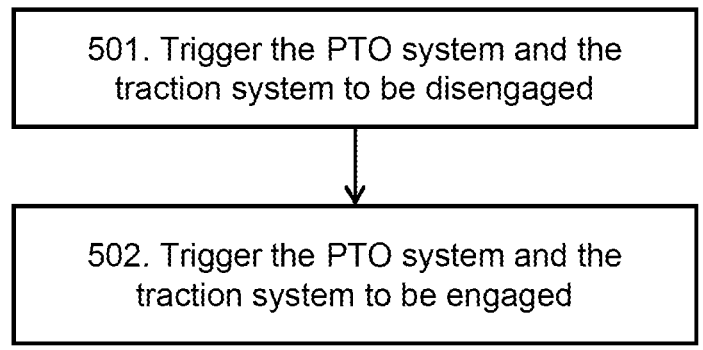
FIG. 4 is a flow chart illustrating a method.

The method performed by the control device 600 for handling engagement and disengagement between the PTO system 305 and the traction system 301 comprised in the system 300 of the at least partly electrically operated vehicle will now be described with reference to the flow chart in FIG. 4.

The traction system 301 may comprises at least one electric machine 310 comprising at least two winding coils 313p, 313s, and the traction system 301 may comprise a first switch S1 and a second switch S2. The traction system 301 may comprise at least one traction battery 315 and at least one inverter 318.

The at least one electric machine 310 may be of a synchronous reluctance type or an induction type. The at least one electric machine 310 may not have permanent magnets on its rotor.

The method in FIG. 4 performed by the control device 600 comprises at least one of the following steps, which steps may be performed in any suitable order than described below:

Step 501

The control device 600 triggers the PTO system 305 and the traction system 301 to be disengaged from each other when the at least partly electrically operated vehicle 100 is in driving mode.

Prior to step 501 or as a part of step 501, the control device 600 may obtain information indicating that the vehicle 100 is in driving mode. The information may be obtained by receiving it from another control device, from a memory unit, or from any other suitable device or unit. The memory unit may be a local memory unit comprised in the vehicle 100 or it may be a cloud memory. The information may be obtained upon request from the control device 600, it may be obtained on a regular basis, it may be pushed to the control device 600 from the other device or unit, or it may be obtained using any other suitable method.

Step 501 may be triggered by detecting that the vehicle 100 is in driving mode, e.g. that the mode has changed from stop mode to driving mode.

The control device 600 controls switching of the first switch S1 and the second switch S1 between open states and closed states.

When the at least partly electrically operated vehicle 100 is in driving mode, then the control device 600 controls switching of the first switch S1 to be in closed state such that the at least two winding coils 313p, 313s are connected in parallel and the at least one electric machine 310 is used for traction of the at least partly electrically operated vehicle 100. When the at least partly electrically operated vehicle 100 is in driving mode, the control device 600 controls the second switch S2 to be in open state such that the PTO system 305 is disengaged from the at least one external load 308.

Using other words, the control device 600 may set the first switch S1 to closed state thus connecting the electric machine winding coils 313s, 313p in parallel. The electric machine 310 may be used purely for traction. The second switch S2 may be in open state.

Step 502

The control device 600 triggers the PTO system 305 and the traction system 301 to be engaged to each other and thereby providing electrical power from the system 300 to at least one external load 308 when the at least one electrically operated vehicle 100 is in stop mode. The electric power may comprise three-phase voltage, single phase voltage or DC.

Prior to step 502 or as a part of step 502, the control device 600 may obtain information indicating that the vehicle 100 is in stop mode. The information may be obtained by receiving it from another control device, from a memory unit, or from any other suitable device or unit. The memory unit may be a local memory unit comprised in the vehicle 100 or it may be a cloud memory. The information may be obtained upon request from the control device 600, it may be obtained on a regular basis, it may be pushed to the control device 600 from the other device or unit, or it may be obtained using any other suitable method.

Step 502 may be triggered by detecting that the vehicle 100 is in stop mode, e.g. that the mode has changed from driving mode to stop mode.

When the at least partly electrically operated vehicle 100 is in stop mode, then the control device 600 controls the first switch S1 to be in open state such that a first winding coil 313p functions as a primary transformer coil and a second winding coil 313s functions as a secondary transformer coil. When the at least partly electrically operated vehicle 100 is in stop mode, the control device 600 controls the second switch S2 to be in closed state. Furthermore, when in stop mode, the at least one electric machine 310 functions as a 1:1 ratio transformer and thus functioning as a galvanic insulator in the system 300.

Using other words, the control device 600 may set the first switch S1 to open state thus changing the electric machine coil 313s to be the primary transformer coil and the electric machine could 313p to be the secondary transformer coil. The electric machine 310 is now a 1:1 transformer or galvanic insulator. The second switch S2 may be in the closed state.

The control unit 600 is adapted to perform the method described herein. To perform the method steps shown in FIG. 4 for handling engagement and disengagement between a PTO system 305 and a traction system 301 in the at least partly electrically operated vehicle 100, the control device 600 may comprise an arrangement as shown in FIG. 5.

The control device 600 may be adapted to control and monitor the engagement and disengagement between the PTO system 305 and the traction system 301. The control device 600 may be partly or completely comprised in the vehicle 100. The control device 600 may be external to and adapted to be connected to the vehicle 100. The control device 600 may be in the form of any suitable computer processor. The control device 600 may or may not have a user interface on which a user or an operator may monitor and interact with the engagement and disengagement between the PTO system 305 and the traction system 301, e.g. by inputting instructions, by checking states of the first switch S1 and the second switch S2, by monitoring errors etc.

The traction system 301 may comprise at least one electric machine 310 comprising at least two winding coils 313p, 313s, and the traction system 301 may comprise a first switch S1 and a second switch S2.

The traction system 301 may comprise at least one traction battery 315 and at least one inverter 318.

The at least one electric machine 310 may be of a synchronous reluctance type or an induction type. The at least one electric machine 310 may not have permanent magnets on its rotor.

The control device 600 is adapted to, e.g. by means of a triggering module 601, trigger the disengagement between the PTO system 305 and the traction system 301 when the at least partly electrically operated vehicle 100 is in driving mode. The triggering module 601 may be referred to as a triggering unit, a triggering means, a triggering circuit, means for triggering etc. The triggering unit 601 may be a processor 603 of the control device 600 or comprised in the processor 603 of the control device 600.

The control device 600 may be adapted to, e.g. by means of the triggering module 601, when the at least partly electrically operated vehicle 100 is in driving mode, trigger the first switch S1 to be in closed state such that the at least two winding coils 313p, 313s are connected in parallel and the at least one electric machine 310 is used for traction of the at least partly electrically operated vehicle 100.

The control device 600 may be adapted to, e.g. by means of the triggering module 601, when the at least partly electrically operated vehicle 100 is in driving mode, trigger the second switch S2 to be in open state such that the PTO system 305 is disengaged from the at least one external load 308.

The control device 600 is adapted to, e.g. by means of the triggering module 601, trigger the PTO system 305 and the traction system 301 to be engaged to each other and thereby providing electrical power from the system 300 to at least one external load 308 when the at least one electrically operated vehicle 100 is in stop mode. The electric power may comprise three-phase voltage, single phase voltage or DC The control device 600 may be adapted to, e.g. by means of the triggering module 601, control switching of the first switch S1 and the second switch S1 between open states and closed states.

The control device 600 may be adapted to, e.g. by means of the triggering module 601, when the at least partly electrically operated vehicle 100 is in stop mode, trigger the first switch S1 to be in open state such that a first winding coil 313p functions as a primary transformer coil and a second winding coil 313p functions as a secondary transformer coil.

The control device 600 may be adapted to, e.g. by means of the triggering module 601, when the at least partly electrically operated vehicle 100 is in stop mode, trigger the second switch to be in closed state. Then, the at least one electric machine 310 functions as a 1:1 ratio transformer and thus functioning as a galvanic insulator in the system 300.

The control device 600 may comprises the processor 603 and a memory 605. The memory 605 comprises instructions executable by the processor 603.

A computer program 608 may comprise instructions which, when executed on at least one processor, e.g. the processor 603 comprised in the control device 600, cause the at least one processor to carry out the method described herein. A carrier may comprise the computer program 608, and the carrier may be one of an electronic signal, optical signal, radio signal or computer readable medium 610.

Figure 5:
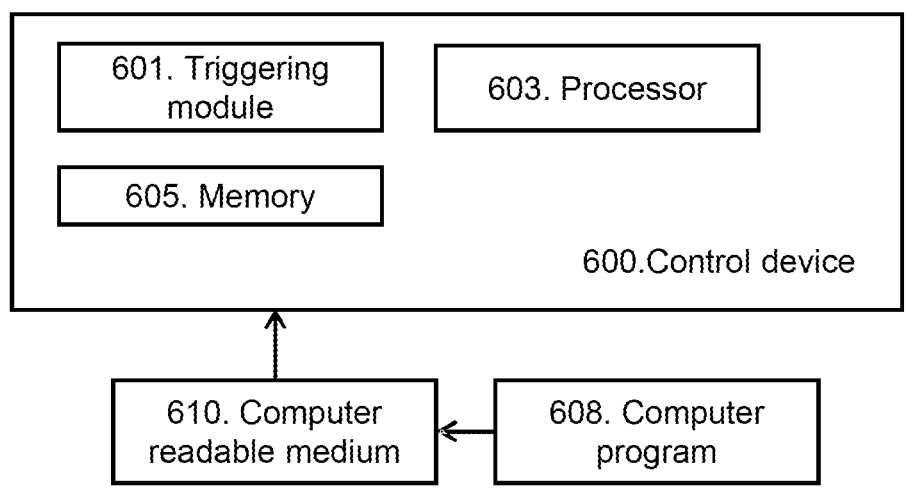
FIG. 5 is a schematic block diagram illustrating a control device.

The method described herein for handling engagement and disengagement between a PTO system 305 and a traction system 301 comprised in a system 300 of the at least partly electrically operated vehicle 100 may be implemented through one or more processors, such as the processor 603 in the control device 600 illustrated in FIG. 5, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the control device 600. One such carrier may be in the form of a CD ROM disc. It is however feasible with other data carriers such as a memory stick. The computer program code can furthermore be provided as pure program code on a server and downloaded to the control device 600.

Summarized, the present invention relates to weight, cost and complexity reduction of the system 300 by using an existing electric machine(s) 310 as a galvanic insulator. The invention may be applied for all PTO systems 305 while vehicle 100 is standing still. The new function of the electric machine 310 is to be a galvanic insulator for the PTO system 305.

In many at least partly electrically operated vehicles 100, there are several electric machines, depending on the vehicle size, which are used either for traction or as electro-mechanical PTO. These machines may be used as already inbuilt galvanic separation (1:1 ratio transformer). One condition may be that the vehicle 100 is standing still, which is always the case when PTO system 305 is used.

With the present invention, the current vehicle electric machines 310 may be used as galvanic insulation part of the system 300, and possibly in particular of the PTO system 305. This is a cost, weight and complexity reduction of the current solution.

With the present invention, the PTO system 305 shares a galvanic insulation function with the motor drive to simplify the system 300, i.e. in which the electric machine 310 functions as a galvanic insulator for the PTO system 305.

The term "at least one of A and B" should be understood to mean "only A, only B, or both A and B.", where A and B are any parameter, number, indication used herein etc.

The term "adapted to" used herein may also be referred to as "arranged to", "configured to", "capable of" or "operative to".

It is to be understood that the present invention is not limited to the embodiments described herein and illustrated in the drawings; rather, the skilled person will recognize that many changes and modifications may be made within the scope of the appended claims.

The invention claimed is:

1. A system for handling disengagement and engagement between a Power Take Off (PTO) system and a traction system in an at least partly electrically operated vehicle,
   the traction system comprises at least one electric machine comprising at least two winding coils, and wherein the traction system comprises a first switch and a second switch,
   wherein the system is adapted to disengage the PTO system and the traction system from each other when the at least partly electrically operated vehicle is in driving mode, and
   wherein the system is adapted to engage the PTO system and the traction system to each other and thereby providing electrical power from the system to at least one external load when the at least one electrically operated vehicle is in stop mode,
   when the at least partly electrically operated vehicle is in driving mode, then:
   the first switch is adapted to be in closed state such that the at least two winding coils are connected in parallel and the at least one electric machine is adapted to be used for traction of the at least partly electrically operated vehicle, and
   the second switch is adapted to be in open state such that the PTO system is disengaged from the at least one external load.

2. The system according to claim 1, wherein the electric power provided to the at least one external load comprises three-phase voltage, single phase voltage or Direct Current, DC voltage.

3. The system according to claim 1, comprising a control device adapted to control switching of the first switch and the second switch between open states and closed states.

4. An at least partly electrically operated vehicle comprising a system according to claim 1.

5. The system according to claim 1, when the at least partly electrically operated vehicle is in stop mode, then:
- the first switch is adapted to be in open state such that a first winding coil is adapted to function as a primary transformer coil and a second winding coil is adapted to function as a secondary transformer coil,
- the second switch is adapted to be in closed state, and
- the at least one electric machine is adapted to be function as a 1:1 ratio transformer and thus functioning as a galvanic insulator in the system.

6. The system according to claim 1, wherein the traction system comprises at least one traction battery and at least one inverter.

7. The system according to claim 1, wherein the at least one electric machine is of a synchronous reluctance type or an induction type.

8. The system according to claim 1, wherein the at least one electric machine does not have permanent magnets on its rotor.

9. A method performed by a control device comprised in an at least partly electrically operated vehicle for handling engagement and disengagement between a Power Take Off (PTO) system and a traction system comprised in a system of the at least partly electrically operated vehicle, the traction system comprises at least one electric machine comprising at least two winding coils, and wherein the traction system comprises a first switch and a second switch, the method comprising:
- triggering the PTO system and the traction system to be disengaged from each other when the at least partly electrically operated vehicle is in driving mode,
- triggering the PTO system and the traction system to be engaged to each other and thereby providing electrical power from the system to at least one external load when the at least one electrically operated vehicle is in stop mode, and
- when the at least partly electrically operated vehicle is in driving mode, then:
  - the first switch is adapted to be in closed state such that the at least two winding coils are connected in parallel and the at least one electric machine is adapted to be used for traction of the at least partly electrically operated vehicle, and
  - the second switch is adapted to be in open state such that the PTO system is disengaged from the at least one external load.

10. A computer program comprising program code means for performing the steps of claim 9 when said program is run on a computer.

11. A computer readable medium carrying a non-transitory computer program comprising program code for performing the steps of claim 9 when said program code is run on a computer.

12. A control device comprised in an at least partly electrically operated vehicle for handling engagement and disengagement between a Power Take Off (PTO) system and a traction system in the at least partly electrically operated vehicle, the control device being configured to perform the steps of the method according to claim 9.

* * * * *